United States Patent [19]

Coufal et al.

[11] Patent Number: 5,280,406
[45] Date of Patent: Jan. 18, 1994

[54] JET DEPOSITION OF ELECTRICAL CHARGE ON A DIELECTRIC SURFACE

[75] Inventors: Hans J. Coufal; Robert K. Grygier, both of San Jose, Calif.

[73] Assignee: International Business Machines Corporation, Armonk, N.Y.

[21] Appl. No.: 900,361

[22] Filed: Jun. 18, 1992

[51] Int. Cl.⁵ .............................................. G03G 13/00
[52] U.S. Cl. ................................................ 361/225
[58] Field of Search ............... 361/225, 226, 227, 228, 361/229, 230; 355/221; 250/324, 326

[56] References Cited

U.S. PATENT DOCUMENTS

| | | | |
|---|---|---|---|
| 3,396,308 | 8/1968 | Whitmore | 317/4 |
| 3,549,962 | 12/1970 | Roth | 317/262 |
| 3,686,374 | 8/1972 | Hawkins | 264/22 |
| 3,761,746 | 9/1973 | Adler | 310/8 |
| 4,021,709 | 5/1977 | Kamogawa et al. | 361/229 |
| 4,213,168 | 7/1980 | Garbett | 361/225 |
| 4,664,856 | 5/1987 | Talbott et al. | 264/24 |
| 4,734,228 | 3/1988 | Micheron et al. | 264/22 |
| 4,762,997 | 8/1988 | Bergen | 250/326 |
| 4,841,331 | 6/1989 | Nakayama et al. | 355/245 |

Primary Examiner—A. D. Pellinen
Assistant Examiner—Aditya Krishnan
Attorney, Agent, or Firm—Robert B. Martin

[57] ABSTRACT

A process for depositing electrical charges on a dielectric surface by means of a high velocity jet of fluid which strikes the surface, flows over it and triboelectrically charges it, and then separates from the surface.

6 Claims, No Drawings

JET DEPOSITION OF ELECTRICAL CHARGE ON A DIELECTRIC SURFACE

FIELD OF THE INVENTION

The present invention is concerned with a process for depositing electrical charges on a dielectric surface by means of a high velocity jet of uncharged fluid.

BACKGROUND OF THE INVENTION

Electrets and polymer electrets in particular have important device applications in current and future products in the electronics and computer industry. They have been used in such devices as capacitors and electret microphones, piezoelectric electrets in loudspeakers, pressure sensors and actuators, pyroelectric electrets in laser power meters and temperature sensors. In order for these dielectrics to have ferroelectric, piezoelectric, pyroelectric or nonlinear optical properties, they must be poled in an intense electric field of the order of 1 Megavolt/cm to uniformly align their electric dipoles. This poling is currently done in one of three ways, by a corona discharge, by uniaxially or biaxially stretching for polymer films or by applying a large voltage across the electret while it is immersed in a high dielectric constant oil. Corona poling is accomplished by using a field emission tip or wire to produce ionized gas molecules which are deposited on the front surface of an electret sheet which is metallized on its back side. With a surface potential of the order of 1000 Volts on an electret with a typical thickness of tens of micrometers, a poling field of approximately 1 Megavolts/cm can be achieved. Problems with corona poling include the use of high voltages at high currents, considerable chemical reactivity due to the ionized species produced, possible sputtering away of the corona tip or wire and gas evolution generated from chemical reaction. Stretching for polymer films can also enhance the orientation of the polymer chains and is often done when the polymer is extruded in sheets and may be done at elevated temperatures or in conjunction with applied electric fields. Obviously stretching cannot be done for crystalline electrets or for polymers on a rigid substrate and for those cases where it can be done, there are considerable changes in the film thickness and roughening of the film's surface. Finally, electrodes may be deposited on both sided of the electret film and a large voltage may be applied across the film while it is immersed in a bath of high dielectric constant oil. This is necessary in order to avoid dielectric breakdown which would occur in air at fields of the order of 30 Kilovolts/cm. Difficulties with this procedure include contamination of the electret with the oil or impurities, the need for both sides to have electrodes and incompatibility with certain applications of polymer electrets such as RAM memories.

Whitmore, U.S. Pat. No. 3,396,308, discloses a device for generating a flow of ionized gas that is directed toward and against the surface of a dielectric web for altering or changing the electrostatic charge on the web.

Roth et al., U.S. Pat. No. 3,549,962, discloses a method for uniformly charging insulating surfaces by providing a surface having a non-uniform charge density thereon and contacting the non-uniformly charged surface with a material causing the charged surface to attain a uniform charge density in contacted areas.

Hawkins, U.S. Pat. No. 3,686,374, discloses a method for increasing the effectiveness of electrostatic pinning of a dielectric film onto an electrically grounded moving surface by passing the film in proximity to but out of contact with at least one electrode. This imparts an electrostatic charge to the surface of the film. In addition, the electrode is surrounded with an atmosphere consisting essentially of a gas in which a wire current before breakdown of at least about 100 microampere/inch of wire can be generated.

Adler, U.S. Pat. No. 3,761,746, discloses poling a ferro-electric body using an ionized gas or other medium as a poling electrode.

Kamogawa et al., U.S. Pat. No. 4,021,709, discloses a method for enhancing the charge retention of a photosensitive layer wherein an ion wind is created and applied to the photosensitive material prior to its reuse.

Garbett, U.S. Pat. No. 4,213,168 discloses a dielectric tape of polyfluoroethylenepropylene which is electrostatically charged to a high level charge density using a motor driven capstan on which the tape is moved at a controlled velocity past a sponge assembly charged by a high DC voltage. The sponge assembly is wetted with a dielectric fluid mixture of methyl alcohol, ethyl alcohol and acetone. By endosmosis, a bead of fluid from between the sponge and the FEP tape causes the fluid to be evenly distributed on the tape.

Talbott et al., U.S. Pat. No. 4,664,856, discloses a method for treating discrete pieces of material to ensure adequate conductance thereof for orientation in an electric field for electrostatic alignment. The material is exposed to a conductance-improving substance or substances, such as an alkali or alkaline earth metal salt of a weak acid, quaternary ammonium salts, or gases such as ammonia, chlorine, sulfur dioxide, etc. prior to being subjected to the electric field.

Micheron et al., U.S. Pat. No. 4,734,228 discloses a method for preparing a material having piezoelectric properties by dipole orientation of a poled dielectric. A dipole polarization is effected by a charged jet of small liquid drops or droplets. An electric field is created between two superficial zones of an object brought to different electric potentials. At least one of the zones is exposed to an electrically charged jet of droplets.

Bergen, U.S. Pat. No. 4,762,997, discloses a method for charging a receptor surface to a predetermined voltage by generating ions in a chamber, entraining the ions in a rapidly moving fluid stream passing into, through and out of the chamber, depositing the ions on a charge receptor and biasing the back of the charge receptor with a bias equal to and of opposite potential of said predetermined voltage desired on the receptor surface.

SUMMARY OF THE INVENTION

The present invention is a process for electrically charging a dielectric surface. The process comprises the steps of directing a jet of uncharged fluid travelling at a velocity of at least 100 meters per second to strike the dielectric surface and to flow over the surface, thereby tribocharging said surface, and then separating the fluid from the surface.

A more thorough disclosure of the present invention is presented in the detailed description which follows.

DETAILED DESCRIPTION OF THE INVENTION

The present invention provides a new method of poling dielectric surfaces to produce materials with ferroelectric, piezoelectric, pyroelectric and non-linear optical properties. The new method overcomes disadvantages of the prior art as discussed above, and is compatible with applications including non-volatile ferroelectric RAMs, photoconductors for electrophotography, and non-linear materials for optical computing and memory.

According to the present invention, the surface of a dielectric can be charged to high electric potentials by a method involving the interaction of the surface with a high velocity jet of fluid, either liquid or gas. High velocity jet tribocharging occurs when high velocity uncharged jets of gases or liquids are passed over the surface of a dielectric, and can charge the surface of dielectrics to a high voltage. The mechanism is a tribocharging effect whereby the gas or liquid flowing at high velocity along the surface acquires or loses a net charge to the surface. The gas or liquid moves away from the surface, and a net negative or positive charge is left on the surface. As long as the gas or liquid flows along the surface the potential at the surface continues to increase until a maximum value is reached. The maximum surface potential obtainable depends on a number of parameters, such as the dielectric's bulk and surface conductivity and thickness as well as the gas or liquid's velocity, dielectric constant, vapor pressure and electrical conductivity.

An important parameter for charging is the dielectric constant of the gas or liquid. For a larger dielectric constant gas or liquid there is more tribocharging. Since liquids have larger dielectric constants than gases they are more efficient in charging the surface of a dielectric. Using chlorodifluoromethane sprayed from a nozzle as a gas, (dielectric constant=1.0035) surfaces were charged to about 100 volts, but when it was sprayed (dielectric constant=6.11), surfaces could be charged to near 3 kilovolts. Higher velocity will also produce more charging, since there is more energy available to transfer charged from the surface to the liquid. It is also desired that the liquid have a high vapor pressure since any liquid remaining on the surface should be removed quickly to avoid discharging. Preferably, the liquid will have a vapor pressure at 30° C. of greater than 50 torr, more preferably greater than 100 torr and even more preferably greater than 760 torr. In addition, it is desirable that the liquid have a small electrical conductivity to avoid transporting the charge along the surface to a point where it may be discharged. For example, water (dielectric constant=78.25) was found to charge polymer surfaces to 1500 volts but, because of the large electrical conductivity due to impurities, the surface charge quickly decays as charge is bled away along the dielectric surface.

Suitable dielectrics for use in the process of the present invention include poly(vinylidene fluoride), polyacetal, polyester and polycarbonate. Suitable fluids for use in the process of the present invention include chlorodifluoromethane, dichlorodifluoromethane, water, acetone, acetonitrile, methanol, butanol and trichlorotrifluoroethane. Preferred fluids include organic fluids and silicone oils. The best liquids for charging seem to be dichlorodifluoromethane and trichlorotrifluoroethane. Most of the surfaces tested charged to a negative potential, which indicated that in general electrons were transferred from the fluid to the polymer. However, in other cases, for example, with acetone on polyacetal, the potentials were positive, indicating that electrons were removed from the surface. In general, it appears that the choice of a fluid will depend upon the polymer that is to be poled and the surface potential and polarity required.

The present invention avoids many of the difficulties associated with other poling methods. It offers a method of producing large surface potentials on thin electret films but without the need of a corona discharge. It will produce little or no contamination or chemical reactions since the gases or liquids used are inert or of low reactivity. It will not deform or roughen the dielectric and can be used on free standing films as well as those prepared on substrates with uneven surfaces. In addition, since the gases or liquids are completely removed after charging the polymer, the manufacturing process and final product can be made completely environmentally safe.

The process of the present invention is applicable to a very wide variety of dielectric surfaces. As mentioned above, the dielectric can be a polymer, and it can also be an inorganic material such as ceramics, silica, or alumina.

The jet streams required for use in the present invention can be obtained by methods well known in the art. The velocity of the jet should be at least 100 meters per second, and preferably greater than the velocity of sound.

The following examples are given to illustrate preferred variations of the present invention, but are not to be construed as limitations of the invention, many variations of which are possible without departing from the spirit or scope thereof.

In the following table, there are listed fluids, dielectric substrates and the resultant voltages obtained by high velocity jet treatment.

| FLUID | DIELECTRIC | VOLTAGE |
| --- | --- | --- |
| Chlorodifluoromethane (liquid) | Poly(vinylidene-fluoride) | −2,500 V |
| Chlorodifluoromethane (liquid) | Poly(methyl-methacrylate) | −3,000 V |
| Chlorodifluoromethane (gas) | Poly(methyl-methacrylate) | −100 V |
| Acetone | Polyacetal | +4,000 V |
| Acetonitrile | Polyacetal | −200 V (fast decay) |
| Water | Polyacetal | −1,500 V (fast decay) |
| Dichlorodifluoromethane (liquid) | Poly(methyl-methacrylate) | +500 V |
| Air | Poly(methyl-methacrylate) | +500 V |
| Nitrogen | Poly(methyl-methacrylate) | +500 V |
| Air | Polyacetal | −300 V |
| Nitrogen | Polyacetal | −200 V |
| Chlorodifluoromethane (liquid) | Poly(tetrafluoro-ethylene) | −1,000 V |
| Dichlorodifluoromethane (liquid) | Poly(tetrafluoro-ethylene) | +300 V |
| Air | Poly(tetrafluoro-ethylene) | +600 V |

What is claimed is:

1. A process for electrically charging a dielectric surface, said process comprising the steps of directing a jet of uncharged fluid of liquid or gas at a velocity of at least 100 meters per second to strike the dielectric surface and to flow over the surface thereby tribocharging said surface, and then separating the fluid from the dielectric surface.

2. A process as claimed in claim 1 wherein the fluid is an organic fluid or a silicone oil.

3. A process as claimed in claim 2 wherein the fluid is a liquid.

4. A process as claimed in claim 2 wherein the dielectric surface is a polymeric material.

5. A process as claimed in claim 2 wherein the fluid is dichlorodifluoromethane.

6. A process as claimed in claim 2 wherein the velocity of the jet is above the speed of sound.

* * * * *